No. 776,604. Patented December 6, 1904.

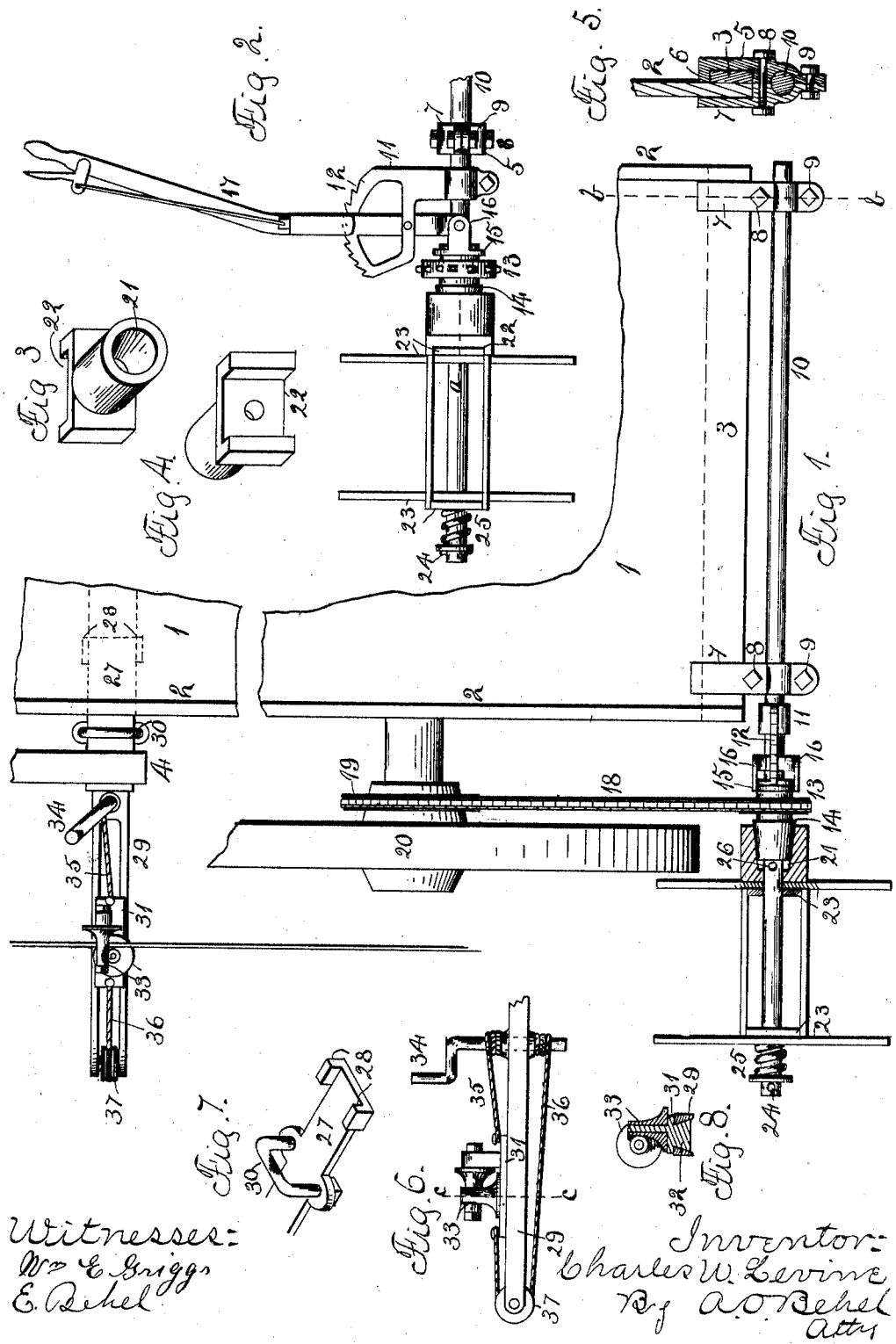

UNITED STATES PATENT OFFICE.

CHARLES W. LEVINE, OF ROCKFORD, ILLINOIS.

REELING DEVICE.

SPECIFICATION forming part of Letters Patent No. 776,604, dated December 6, 1904.

Application filed May 20, 1904. Serial No. 208,793. (No model.)

*To all whom it may concern:*

Be it known that I, CHARLES W. LEVINE, a citizen of the United States, residing at Rockford, in the county of Winnebago and State of Illinois, have invented certain new and useful Improvements in Reeling Devices, of which the following is a specification.

The object of this invention is to rewind a fence-wire upon a reel which is supported by a wagon and operated by a connection with one of the supporting-wheels.

In the accompanying drawings, Figure 1 is a plan view, partly in section on dotted line $a$, Fig. 2, of a portion of a wagon-box to which my improvements have been applied. Fig. 2 is a rear elevation of my improvements. Figs. 3 and 4 are isometrical representations of part having a connection with the reel. Fig. 5 is a section on dotted line $b$, Fig. 1. Fig. 6 is an elevation of the outer section of the wire-guide. Fig. 7 is an isometrical representation of the end of the frame supporting the wire-guide. Fig. 8 is a section on dotted line $c$, Fig. 6.

The wagon-box is composed of the bottom 1, sides 2, rear under brace 3, and footboard 4. To the under brace 3 are connected two brackets, each composed of the lower section 5, having an upturned inner end 6, embracing the inner edge of the under brace 3, and an upper section 7, lying in contact with the upper surface of the bottom. These two sections are connected by the bolt 8, and the free outer ends of the sections are connected by a bolt 9. Each bracket has a circular opening. A bar 10 is located in the circular openings of the brackets, by means of which it is supported by the wagon-box. To the shaft 10 is clamped a bracket 11, having its upper edge in saw-toothed form 12. A sprocket-wheel 13 has a connection with a cone-shaped friction 14, and the hub has an annular groove receiving a ring 15, provided with two arms 16. A lever 17 has its lower end in fork form, the free ends of which have a connection with the arms 16. This lever is provided with the usual dog and thumb-lever connection with the toothed bracket.

The hub supporting the sprocket-wheel and cone friction is mounted slidably on the shaft, and by means of the hand-lever the parts can be moved in the lengthwise direction of the bar and held when adjusted. A chain 18 connects the sprocket-wheel 13 with a sprocket-wheel 19, connected to one of the wheels 20 of the wagon, so that as the wagon is drawn over the ground the sprocket-wheel 13 and cone friction will be rotated thereby.

Upon the bar 10 is mounted a clutch device having a cone-shaped cavity 21 fitted to receive the cone friction 14. The other end of this clutch device has a groove 22 of a size to receive one of the end boards 23 of a wire-reel, thereby forming a connection between the clutch device and reel.

After the reel is placed on the bar a pin 24 is placed through the bar, and a spring 25 is placed between the pin and reel, which will hold the clutch device in contact with the pin 26, extending through the bar.

By means of the hand-lever the cone friction can be moved into engagement with the clutch device, thereby rotating the reel through its connection with the wheel of the wagon.

By reason of the cone friction connection between the wagon-wheel and wire-reel the reel can slip if it is being turned faster than necessary to properly wind the wire on the reel.

To the footboard 4 is connected a bracket 27, having upturned ears 28 and a slotted shank 29, which is beveled, as shown at Fig. 8. These upturned ends embrace one of the supports for the footboard, and a clamp 30 connects the bracket with the support. A shield 31 is supported by the bracket and has a depending projection 32 located in the slotted portion. This slide supports two rollers 33, supported upon studs extending at right angles to each other. A crank 34 is supported by the bracket and has sections extending each side of the bracket. A cable 35 connects the crank and the slide, and a cable 36 connects the crank beneath the bracket, passing over a pulley 37, supported by the bracket, and connects with the slide.

By means of the crank the cable 35 can be wound thereon, which will move the slide toward it, and at the same time the cable 36 will unwind therefrom. A reverse movement of the crank will move the slide toward the free end of the bracket.

The object of moving the slide 31 is to feed the wire guided by the roller 33 to the reel, so that it will wind evenly thereon.

I claim as my invention—

1. A reel-support comprising two brackets, each bracket composed of two sections, the lower section having a grooved way in its upper face adapted to receive the under brace of the rear end of a wagon-body, a stationary bar supported by the brackets, a bolt connecting the sections of a bracket, and a clutch member loosely mounted on the bar having one end formed with a conical cavity and its other end with a transverse groove adapted to receive one of the end bars of a reel, another clutch member loosely mounted on the bar supporting a sprocket-wheel and having one end in cone shape, a chain connection between the sprocket-wheel and one of the carrying-wheels of the wagon, and a lever for moving the cone-shaped clutch member into and out of engagement with the conically-recessed member.

2. The combination of a rotatable reel-support, a guide for the wire comprising a support, rollers movable in the lengthwise direction of the support, a crank having a connection with the support, a pulley located at the free end of the support, a cable having its ends connected to the crank and passing over the pulley and the rollers moved by the cable.

CHARLES W. LEVINE.

Witnesses:
E. BEHEL,
A. O. BEHEL.